Naruse

[11] 4,275,115
[45] Jun. 23, 1981

[54] MAGNETIC RECORDING COMPOSITION AND ARTICLE COATED THEREWITH

[75] Inventor: Tunehide Naruse, Yokohama, Japan

[73] Assignee: Victor Company of Japan, Limited, Yokohama, Japan

[21] Appl. No.: 34,284

[22] Filed: Apr. 27, 1979

[30] Foreign Application Priority Data

Apr. 29, 1978 [JP] Japan ................................. 53/50962

[51] Int. Cl.³ ............................................ C04B 35/04
[52] U.S. Cl. ................................ 428/329; 252/62.54; 252/62.56; 428/339; 428/900; 428/694
[58] Field of Search ............................. 427/127–132; 252/62.54, 62.56; 428/900, 329, 339, 539

[56] References Cited
U.S. PATENT DOCUMENTS 3,687,725  8/1972  Hartmann ........................... 117/235

Primary Examiner—Bernard D. Pianalto
Attorney, Agent, or Firm—Lowe, King, Price & Becker

[57] ABSTRACT

A magnetic recording composition comprising a non-aqueous dispersion, in liquid dispersion medium, of a dispersed solid phase of a major proportion of magnetic powder and minor proportions of at least two types of non-magnetic powder. One type of the non-magnetic powder has a Mohs' hardness of greater than 7, inclusive, and is contained in an amount of from 1 to 5 wt% of the magnetic powder. The other type of the non-magnetic powder has a Mohs' hardness of smaller than 7 but greater than about 3 and is contained in an amount of from 1 to 15 wt% of the magnetic powder. Either one type or the other type of the non-magnetic powder can be composed of two different kinds of non-magnetic materials whose total amount should be within the above-recited range.

7 Claims, 6 Drawing Figures

MAGNETIC RECORDING COMPOSITION AND ARTICLE COATED THEREWITH

This invention relates to a magnetic recording composition using a specific type of dispersed phase and more particularly, to a magnetic composition comprising a major proportion of magnetic powder and minor proportions of at least two types of non-magnetic powder and to articles coated therewith.

Various types of magnetic recording and reproducing articles are known as tapes, sheets, discs and cards and are used in practice for many purposes. The trend of studies of these articles has been heretofore directed mainly to improvements on their electric characteristics along the lines of development where both dispersability of solid phase and surface smoothness of the magnetic layer are improved. Recent pervasion of video recording and reproducing sets has accompanied by an increased demand of magnetic tapes or allied articles. The magnetic tapes have found application in various ways including a still picture reproduction as will not be experienced until relatively lately. Thus, the magnetic tapes or other magnetic articles which meet the above demand have to be imparted with, aside from excellent electric characteristics, durabilities against uses of repeated reproduction and still picture reproduction as characteristically expressed both in terms of a lowering of output power level, and a less tendency to abrasion loss of recording and reproducing heads.

In order to attain high level of the durability to the repeated use of reproduction, an attempt has been made to add hard powder to a magnetic recording composition. However, this attempt fails to improve the durability against the still picture reproduction and correct the tendency to the abrasion loss.

It is therefore an object of the present invention to provide a magnetic recording composition which overcomes the disadvantages of prior art compositions and will satisfactorily withstand use in repeated reproduction or still picture reproduction.

It is another object of the present invention to provide a magnetic recording composition which shows a much less tendency to abrasion of recording or reproducing head when applied as a magnetic layer.

It is a further object of the present invention to provide a magnetic recording composition which shows a less tendency to clog the head surface when applied as a magnetic article.

It is a still further object of the present invention to provide magnetic articles coated with the just-mentioned type of the composition.

The above objects can be achieved by a magnetic recording composition which comprises a non-aqueous dispersion, in liquid dispersion medium, of a dispersed solid phase of a major proportion of magnetic powder and minor proportions of at least two types of non-magnetic powder, one type having a Mohs' hardness of greater than 7, inclusive, and being contained in an amount of from 1 to 5 wt% of said magnetic powder, the other type having a Mohs' hardness of smaller than 7 but greater than about 3 and being contained in an amount of from 1 to 15 wt% of said magnetic powder.

It will be noted that the Mohs' hardness used herein is intended to means an old Mohs' scale of hardness, not a new one.

The present invention will be described in more detail.

A prominent feature of the present invention resides in that at least two types of non-magnetic powder is incorporated in the solid dispersed system. As described above, the one type of the non-magnetic powder should have a Mohs' hardness greater than 7, inclusive. Any non-magnetic materials which satisfy the above requirement may be used and include, for example, $Cr_2O_3$, alumina, silicon carbide, quartz, titanium oxide, zirconia and the like. This type of the non-magnetic powder is generally used in an amount of from 1 to 5 wt%, preferably 3 wt% to 5 wt%, of the magnetic powder used. Larger amount will be disadvantageous in view of a fact that the abrasion loss of reproducing and recording heads increases materially and a maximum magnetic flux density of final magnetic tape is lowered to a significant extent. On the other hand, less amount is undesirable since there becomes too great the lowerings of the output power level as determined by a repeated reproduction and a still picture reproduction tests which will be described hereinafter.

The other type of the non-magnetic powder should have a Mohs' hardness of smaller than 7 but greater than about 3 and includes, for example, $CaCO_3$, zinc ferrite, α-iron oxide, tin oxide and the like though any non-magnetic materials showing the Mohs' hardness within the above-recited range may be used. For instance, glass materials which exhibit the Mohs' hardness in the above range may be likewise used. The non-magnetic powder of this type is generally used in an amount of from 1 to 15 wt%, preferably 5 to 10 wt%, of the magnetic powder. Larger amount will undesirably increase the abrasion loss of the heads and decrease significantly the maximum magnetic flux density. Less amount will not offer any significant advantages as will be ordinarily expected by the addition. The two types of the non-magnetic materials may be used in various arbitrary combinations of the above-mentioned respective materials. Preferably mentioned are combinations of $Cr_2O_3$ and $CaCO_3$, $Cr_2O_3$ and zinc ferrite, alumina and zinc ferrite, quartz and tin oxide, and titanium oxide and calcium carbonate. These combinations may be properly used depending on the purpose in end use. If, for example, the lowerings of output level are desired to be suppressed to a minimum, the combination of alumina (with a Mohs' hardness of 9) and zinc ferrite (with a Moh's hardness of 6.5) or the like combinations which are rather high in Mohs' hardness within the respective defined ranges are preferably used. On the contrary, when it is desired to suppress the abrasion loss to a degree as small as possible, combinations of the respective non-magnetic powder showing smaller Mohs' hardnesses within the defined ranges, respectively, may be preferably used including combinations of titanium oxide (with a Mohs' hardness of 7) and calcium carbonate (with a Mohs' hardness of 3-4), quartz (with a Mohs' hardness of 7) and tin oxide (with a Mohs' hardness of 6) and the like. It will be noted that the abrasion loss is closely related to a head clogging tendency, i.e. greater the abrasion loss, the head is more susceptible to clogging as will be discussed in more detail hereinafter.

According to the preferred aspect of the present invention, the non-magnetic powder is composed of a three-component system rather than the above-described two-component system. In the three-component system, whichever type of the non-magnetic powder with higher or smaller Mohs' hardness may be used as two components of the three-component system. That is, two different kinds of non-magnetic powder with the higher Mohs' hardness may be used together with a remaining one component of the type showing the lower Mohs' hardness. Alternatively, two different kinds of non-magnetic powder with the lower Mohs' hardness may be used in combination with the other type of non-magnetic powder with the higher Mohs' hardness. In either case, the output characteristics, head abrasion loss and maximum magnetic flux density becomes superior, as a whole, to those of the two-component non-magnetic systems as will be clearly understood from Examples appearing hereinlater. Needless to say, the non-magnetic materials used for the two-component systems are likewise used for this purpose.

As typical and, in fact, preferable examples of the three-component systems, there may be mentioned combinations of alumina (Mohs' hardness of 9), $Cr_2O_3$ (Mohs' hardness of 7) and zinc ferrite (Mohs' hardness of 6), $Cr_2O_3$, zinc ferrite and calcium carbonate (Mohs' hardness of 3-4), and silicon carbide (Mohs' hardness of 9.3), titanium oxide (Mohs' hardness of 7) and $\alpha$-iron oxide (Mohs' hardness of 6). In these three-component systems, the non-magnetic powder of higher Mohs' hardness is used in the range of from 1 to 5 wt% and that of smaller Mohs' hardness is in the range of from 1 to 15 wt%, both based on the magnetic powder used, irrespectively of a fact that either type of the non-magnetic powder consists of two components.

Conveniently, the non-magnetic powder is controlled to have an average particle size of below $2\mu$. This is because the average size exceeding $2\mu$ will tend to deteriorate the S/N ratio of final magnetic recording article.

The magnetic materials and the liquid dispersion media to be used in the practice of the invention may be those known to the art and will be described breifly.

The magnetic materials useful in the present invention are, for example, $\gamma$-$Fe_2O_3$, Co-$\gamma$-$Fe_2O_3$, Co-$Fe_2O_3$, Fe-Co alloys, Fe-Co-Ni alloys, Fe and the like in the form of powder with a generally accepted particle size.

The liquid dispersion media for the magnetic recording composition are usually comprised of major proportions of organic solvent and resinous binder and minor proportions of additives.

As for the solvent, any known solvent systems which are usually employed for the magnetic recording purposes and are capable of dissolving the binder are usable but mixed solvent systems such as methyl ethyl ketone, methyl isobutyl ketone and toluene are suitably used. The choice of the solvent system is dependent on the type of binder or solid dispersed system, the manner of application and the like. The amount of the solvent is not critical and is also dependent particularly on the type of binder and the manner of application and should preferably be determined experimentally for specific uses.

The useful binders are, for example, polyisocyanate used in combination with other resins or elastomers having functional groups reactive with the polyisocyanate such as polyvinyl alcohol-containing vinyl chloride-vinyl acetate copolymer, polyurethane elastomer, polyether, polyol, phenoxy resin and the like. Further, vinyl chloride-vinyl acetate copolymer which is not reactive with the polyisocyanate is usable in combination with polyisocyanate and/or thermoplastic saturated resins or nitrile rubber.

Examples of the polyisocyanate are 2,4-tolylenediisocyanate, 2,6-tolyelenediisocyanate, hexamethylenediisocyanate, a reaction product of 3 moles of 2,4-tolylenediisocyanate and 1 mole of trimethylolpropane, and the like.

In a broad aspect, the magnetic power and the resinous binder are usually mixed in amounts of 65-90 wt% and correspondingly 35-10 wt%, respectively, to allow formation of a continuous, adherent magnetic layer or film on substrate.

As typical of the additives mentioned are a dispersant such as soybean lecithin, a lubricant such as a natural fat or oil, higher fatty acids and their esters or the like, a crosslinking agent such as polyisocyanate, and the like.

The composition according to the invention can be readily prepared by mixing the magnetic powder and at least two types of non-magnetic powder, binder and other additives in organic solvent by a suitable means such as a sand mill. The mixture is then applied onto a desired substrate by any of known techniques. The applied substrate is dried, surface calendered, and cured as usual to obtain a magnetic medium. The composition according to the invention may be applied as magnetic tapes, magnetic sheets, magnetic discs or magnetic cards for audiophonic systems or computer systems. It has particular utility as a magnetic video recording tape. For the purpose, the substrate is, for example, plastic films such as a polyester film.

The present invention will be particularly illustrated in the following examples. Comparative examples will be also described. In the examples and comparative examples, magnetic tapes were made and evaluated by measurements of an abrasion loss of head, lowerings of output power level by a still picture reproduction test and also by a repeated reproduction test and a maximum magnetic flux density, and also by a visual observation of head to know a degree of staining or clogging of the head which had been practically applied for 100 hours.

The measuring methods used are as follows.

The abrasion loss was determined by a method in which a tape to be tested was set in a video magnetic recorder and reproducing device and reproduced for 100 hours and then the used head was observed to measure the abrasion loss for expression in terms of microns.

The lowering of output power level by a still picture reproduction test was determined as follows. A tape to be tested was set in a video magnetic recorder and reproducing device using two helical heads and subjected to a reproduction in a still picture state, where the reproducing head alone was moved relative to the tape, for 60 minutes, after which the power level was measured to determine a lowering of output level as a difference between the reproduction output levels before and after the tape had been subjected to the still picture reproduction for 60 minutes.

The lowering of output level by a repeated reproduction test was determined as follows: A tepe to be tested was repeatedly reproduced 100 times by the use of a video recording and reproducing tester to determine the lowering of the output level similarly to the above case.

The lowering by the still picture reproduction test means a so-called still picture characteristic while the lowering by the repeated reproduction test is a measure for durability of tape.

The maximum magnetic flux density was determined by a usual manner using a B-H curve tracer (Model BHH-50 available from Riken Denshi Co., Ltd. Japan).

EXAMPLE 1

| | |
|---|---|
| Co—Fe$_3$O$_4$ | 100 parts by weight |
| Mixture of polyvinyl alcohol-containing vinyl chloride-vinyl acetate copolymer and polyurethane elastomer (binder) | 20 parts by weight |
| Soybean lecithin (dispersant) | 1 part by weight |
| Oleic acid and silicon oil (lubricant) | 2 parts by weight |
| Mixture of methyl ethyl ketone, methyl isobutyl ketone and toluene (solvent) | 250 parts by weight |

The composition of the above formulation was mixed and dispersed in a dispersing machine, agitated with an agitator, and stored for subsequent uses. To the dispersion were then added Cr$_2$O$_3$ with a Mohs' hardness of 7 and CaCO$_3$ with a Mohs' hardness of 3-4 both in predetermined different amounts within and outside the ranges defined in the invention, followed by mixing uniformly. To each of the mixtures was further added 2 parts by weight of polyisocyanate. The mixture was then applied onto a base film, dried, surface-calendered, and cured. The cured film was slitted into tapes with a predetermined width. The tape was ready for use as a magnetic video recording tape. Thus, there were obtained magnetic video recording tapes using different amounts of the non-magnetic materials. Each tape was subjected to the measurements in the manner as described above to determine the abrasion head loss, the lowerings of output level by the two different test methods and the maximum magnetic flux density. The results are shown in FIGS. 1 to 4.

BRIEF DESCRIPTION OF THE DRAWING

When fine particles or dust (which is, in most cases, produced from the magnetic layer) attaches to the head surface during the course of the still picture reproduction or repeated reproduction, the head clogging generally tends to take place.

EXAMPLE 2

Figure 1:
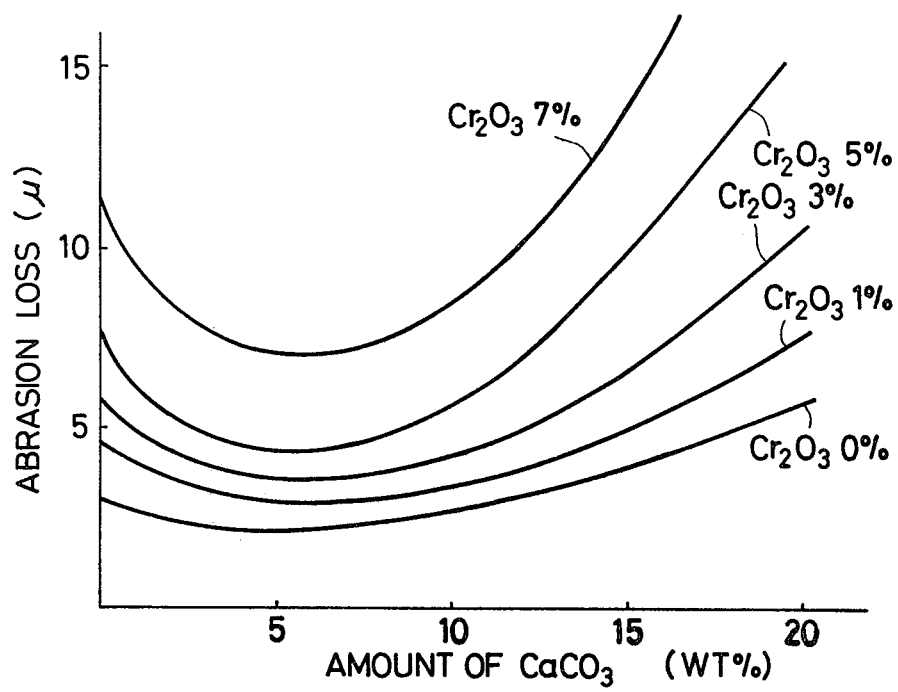
FIG. 1 shows curves of an abrasion loss of head in relation to variation in amount of CaCO$_3$ for different amounts of Cr$_2$O$_3$. From the figure it will be seen that the abrasion loss increases with an increase of the amount of Cr$_2$O$_3$ but decreases when CaCO$_3$ is added in a certain range of amount. The effect of the addition of CaCO$_3$ becomes more pronounced when Cr$_2$O$_3$ is used in larger amount.
Figure 2:
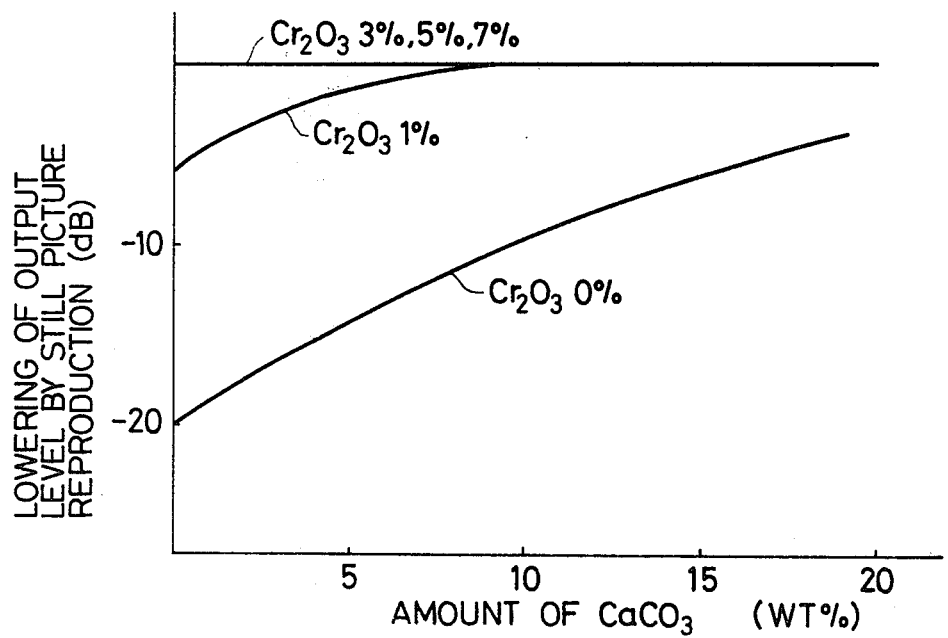
In FIG. 2 there is shown a lowering of reproduction output level of the tapes in relation to variation in amount of CaCO$_3$ for different amounts of Cr$_2$O$_3$. As will be clearly seen from the figure, the tapes using Cr$_2$O$_3$ in amounts not smaller than about 3 wt% based on the magnetic material show an excellent still picture characteristic. In cases where the amount of Cr$_2$O$_3$ is below 3 wt% of the magnetic material, the tapes are more or less influenced by the addition of CaCO$_3$. It is generally accepted that an allowable range of the lowering of the output level is within −6 dB as determined by the still picture reproduction test of 60 minutes. In this sense, the tapes using Cr$_2$O$_3$ in amounts of above 1 wt%, inclusive, satisfy the above requirement.
Figure 3:
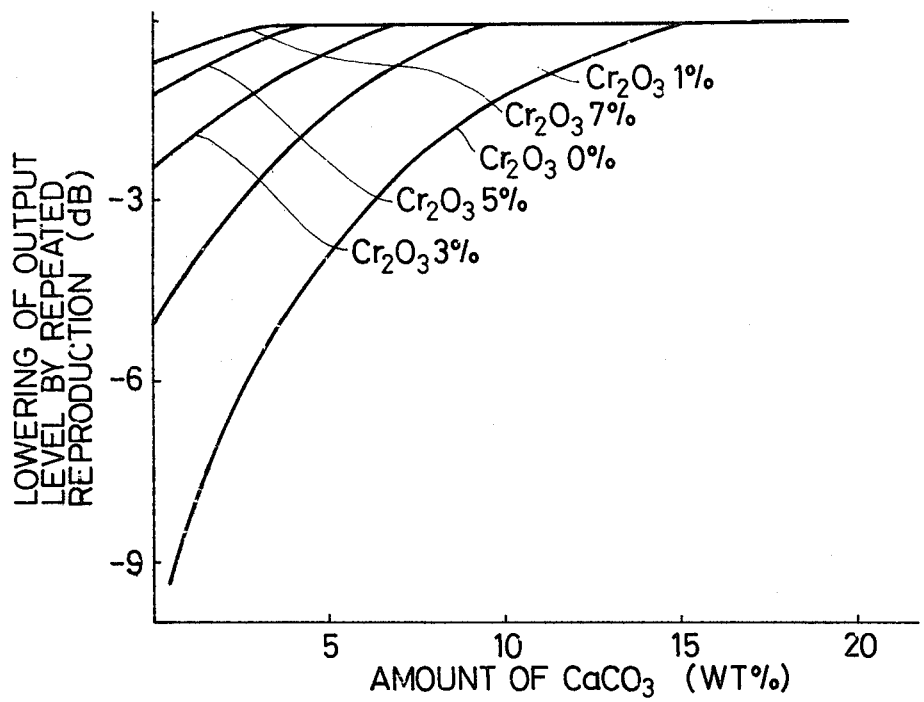
FIG. 3 shows curves of a lowering of reproduction output level of each tape by the repeated test. It is generally accepted that an allowable range of the lowering after the repeated reproduction test is within −4 dB. This is satisfied when Cr$_2$O$_3$ and CaCO$_3$ are each added in amounts of above about 1 wt%, inclusive, based on the magnetic material.
Figure 4:
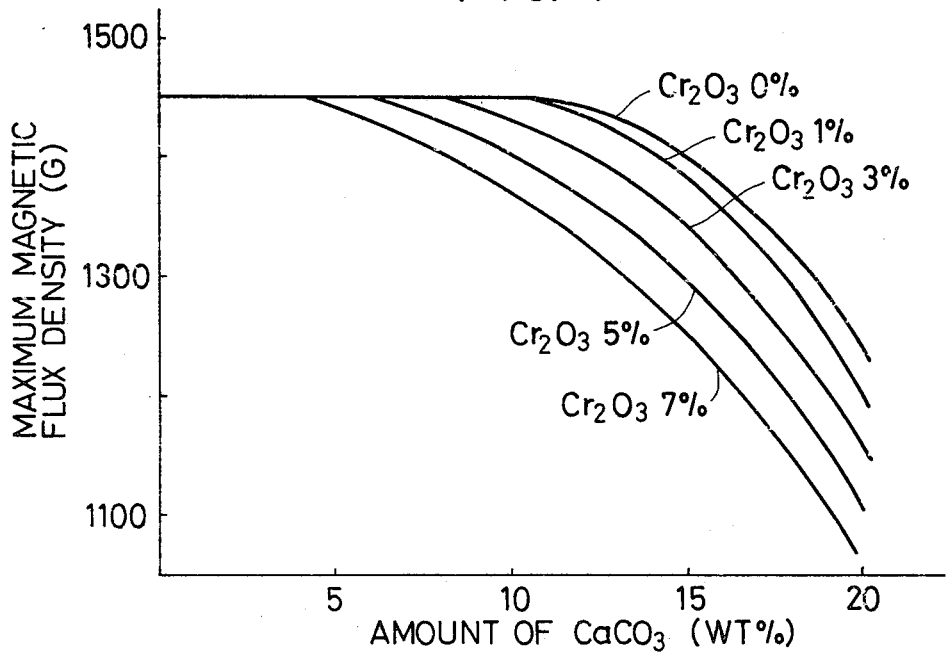
FIG. 4 shows a variation of the maximum magnetic flux density of each tape. From the figure, it will be seen that when the total amount of a combination of the two types of the non-magnetic powder exceeds about 20 wt% of the magnetic material, the maximum magnetic flux density is lowered considerably.
Figure 5:
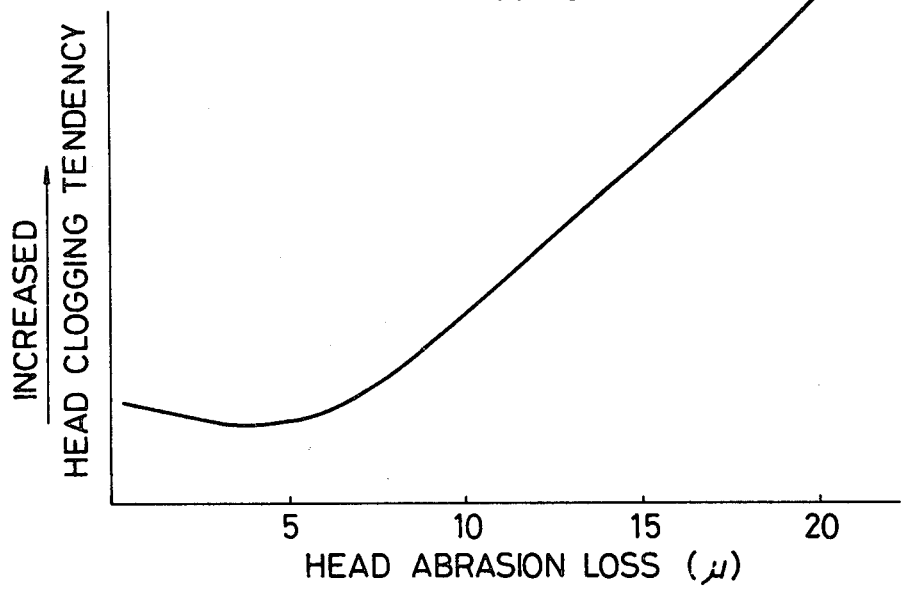
FIG. 5 shows a relation between an abrasion loss of the head and a tendency to head clogging. The clogging tendency is evaluated on the basis of a visual observation of the head to know a degree of staining of the head surface. From this, it is found that the head clogging tends to occur when the abrasion loss exceeds 5μ. In order to keep the abrasion loss within a range of below 5μ, amounts of Cr$_2$O$_3$ and CaCO$_3$ are, respectively, in ranges of 1-5 wt% and 1-15 wt% based on the magnetic material used as seen from FIG. 1. Though the abrasion loss is also kept within the above-indicated range in case where no Cr$_2$O$_3$ is added, the output potential is lowered considerably, as is clear from FIG. 2, when undergoing the still picture reproduction.

| | |
|---|---|
| C0—Fe$_3$O$_4$ | 100 parts by weight |
| Mixture of polyvinyl alcohol-containing vinyl chloride-vinyl acetate copolymer and thermoplastic polyester (binder) | 20 parts by weight |
| Soybean lecithin (dispersant) | 1 part by weight |
| Oleic acid and liquid paraffin (lubricant) | 2 parts by weight |
| Mixture of methyl ethyl ketone, methyl isobutyl ketone and toluene | 250 parts by weight |

The composition of the above formulation was mixed and dispersed in a dispersing device and charged into a storage tank in which it was agitated by means of an agitator. To the dispersion were added Cr$_2$O$_3$ with a Mohs' hardness of 7 and zinc ferrite with a Mohs' hardness of 6.5 in amounts within and outside the ranges defined in the present invention as indicated in Table 1. The mixture were uniformly mixed, to which was added 2 parts by weight of polyisocyanate. Each dispersion was applied onto a film base, dried, surface calendered and cured to induce the crosslinkage of the binder resin, followed by slitting to obtain a magnetic video recording tape with a predetermined width.

The thus obtained tape were each tested to determine the abrasion loss of head (100 hours), still picture reproduction characteristic (60 minutes), durability against repeated reproduction operation (100 times), head anti-clogging tendency and maximum magnetic flux density, with the results shown in Table 1.

TABLE 1

| Amount of Cr$_2$O$_3$ (parts by weight) | Amount of zinc ferrite (parts by weight) | Head abrasion loss (μ) | Lowering of output level by still picture reproduction test of 60 min. (dB) | Lowering of output level by repeated reproduction test of 100 times (dB) | Anti-clogging tendency | Maximum magnetic flux density (Gauss) |
|---|---|---|---|---|---|---|
| 0.5 | 15 | 4 | −7.0 | −0.5 | good | 1410 |

TABLE 1-continued

| Amount of $Cr_2O_3$ (parts by weight) | Amount of zinc ferrite (parts by weight) | Head abrasion loss ($\mu$) | Lowering of output level by still picture reproduction test of 60 min. (dB) | Lowering of output level by repeated reproduction test of 100 times (dB) | Anti-clogging tendency | Maximum magnetic flux density (Gauss) |
|---|---|---|---|---|---|---|
| 1 | 0.5 | 4 | −6.3 | −4.5 | good | 1470 |
| 1 | 1 | 4 | −5.0 | −4.0 | good | 1470 |
| 1 | 7 | — | −2.0 | −1.3 | — | 1450 |
| 1 | 15 | 6 | −0.3 | −0.2 | good | 1370 |
| 2 | 6 | 4 | −1.0 | −1.2 | good | 1460 |
| 3 | 0.5 | 7 | −0.2 | −2.3 | rather poor | 1460 |
| 3 | 1 | 6 | −0.2 | −2.0 | good | 1450 |
| 3 | 7 | — | −0.2 | −0.6 | — | 1440 |
| 3 | 15 | 7 | −0.2 | −0.2 | good | 1340 |
| 3 | 20 | 12 | −0.2 | −0.2 | rather poor | 1180 |
| 5 | 0.5 | 8 | −0.1 | −1.6 | rather poor | 1450 |
| 5 | 1 | 7 | −0.1 | −1.2 | good | 1450 |
| 5 | 7 | — | −0.1 | −0.2 | — | 1430 |
| 5 | 15 | 9 | −0.1 | −0.2 | rather poor | 1280 |
| 5 | 20 | — | −0.1 | −0.2 | — | 1100 |
| 7 | 0.5 | 12 | −0.1 | −0.1 | poor | 1420 |

From the above results, it is found that the tapes using the non-magnetic materials both in amounts within the range of the invention, all the characteristics or properties are satisfactorily acceptable. In other words, the tapes showing excellent anti-clogging tendencies are also excellent in other properties.

EXAMPLE 3

Example 2 was repeated using alumina with a Mohs' hardness of 9 instead of $Cr_2O_3$ thereby obtaining magnetic video recording tapes.

The thus obtained tapes were also tested to determine the head abrasion loss, still picture characteristic, durability against the repeated reproduction operation, head anti-clogging tendency and maximum magnetic flux density similarly to the case of Example 2, with the results shown in Table 2.

TABLE 2

| Amount of alumina (parts by weight) | Amount of zinc ferrite (parts by weight) | Head abrasion loss ($\mu$) | Lowering of output level by still picture reproduction test of 60 min. (dB) | Lowering of output level by repeated reproduction test of 100 times (dB) | Anti-clogging tendency | Maximum magnetic flux density (Gauss) |
|---|---|---|---|---|---|---|
| 0.5 | 15 | 4 | −6.7 | −0.5 | good | 1410 |
| 1 | 0.5 | 5 | −6.2 | −4.2 | good | 1480 |
| 1 | 1 | 5 | −4.3 | −3.6 | good | 1480 |
| 1 | 7 | — | −1.8 | −1.0 | — | 1460 |
| 1 | 15 | 6 | −0.3 | −0.2 | good | 1350 |
| 2 | 6 | 4 | −0.8 | −0.8 | good | 1460 |
| 3 | 0.5 | 8 | −0.2 | −2.4 | rather poor | 1450 |
| 3 | 1 | 7 | −0.2 | −2.0 | good | 1410 |
| 3 | 7 | — | −0.2 | −0.6 | — | 1420 |
| 3 | 15 | 8 | −0.2 | −0.2 | good | 1290 |
| 3 | 20 | 12 | −0.2 | −0.2 | rather poor | 1170 |
| 5 | 0.5 | 9 | −0.1 | −1.2 | rather poor | 1450 |
| 5 | 1 | 7 | −0.1 | −0.8 | good | 1460 |
| 5 | 7 | — | −0.1 | −0.2 | — | 1410 |
| 5 | 15 | 12 | −0.1 | −0.2 | rather poor | 1260 |
| 5 | 20 | — | −0.1 | −0.2 | — | 1120 |
| 7 | 0.5 | 15 | −0.1 | −0.1 | poor | 1440 |

From the above results, it is found similarly to Example 2 that the tapes using the non-magnetic materials in amounts within the range defined in the invention and showing excellent anti-clogging tendencies are excellent in other characteristics or properties.

EXAMPLE 4

Example was repeated using, instead of $Cr_2O_3$ and zinc ferrite, 2 parts by weight of silicon carbide with a Mohs' hardness of 9.3 and 6 parts by weight of $\alpha$-iron oxide with a Mohs' hardness of 6, respectively, thereby obtaining a magnetic video recording tape.

This tape was tested similarly to the case of Example 2, with the results that the head abrasion loss was $5\mu$, the lowering of output level by still picture reproduction was −0.6 dB, the lowering of output level by repeated reproduction was −0.8 dB, the anti-clogging tendency was good, and the maximum magnetic flux density was 1450 G, thus being excellent.

EXAMPLE 5

Example 2 was repeated using, instead of $Cr_2O_3$ and zinc ferrite, 2 parts by weight of quartz with a Mohs' hardness of 7 and 6 parts by weight of tin oxide with a Mohs' hardness of 6.0, respectively, thereby obtaining a magnetic video recording tape.

The tape was tested similarly to the case of Example 2 with the following results:

| | |
|---|---|
| Head abrasion loss | 3 $\mu$ |
| Lowering of output level by still picture reproduction test | −1.0 dB |
| Lowering of output level by repeated reproduction test | −1.2 dB |
| Anti-clogging tendency | good |
| Maximum magnetic flux density | 1460 G |

Thus, the tape was excellent in the characteristics or properties.

EXAMPLE 6

Example 2 was repeated using, instead of $Cr_2O_3$ and zinc ferrite, 2 parts by weight of titanium oxide with a Mohs' hardness of 7 and 6 parts by weight of calcium carbonate with a Mohs' hardness of 3–4, respectively, thereby obtaining a magnetic video recording tape.

The thus obtained tape was subjected to measurements of its properties and characteristics similarly to the case of Example 2, with the following excellent results:

| | |
|---|---|
| Head abrasion loss | 3 μ |
| Lowering of output level by still picture reproduction test | −1.2 dB |
| Lowering of output level by repeated reproduction test | −2.4 dB |
| Anti-clogging tendency | good |
| Maximum magnetic flux density | 1470 G |

EXAMPLE 7

Example 2 was repeated except that 2 parts by weight of zirconia with a Mohs' hardness of 7 and 6 parts by weight of glass with a Mohs' hardness of 6 were used instead of $Cr_2O_3$ and zinc ferrite, respectively, thereby obtaining a magnetic video recording tape.

The tape was tested similarly to Example 2, with the following excellent results:

| | |
|---|---|
| Head abrasion loss | 3 μ |
| Lowering of output level by still picture reproduction test | −1.0 dB |
| Lowering of output level by repeated reproduction test | −1.8 dB |
| Anti-clogging tendency | good |
| Maximum magnetic flux density | 1440 G |

EXAMPLE 8

This example illustrates use of three-component non-magnetic systems.

| | |
|---|---|
| CO—$Fe_3O_4$ | 100 parts by weight |
| Mixture of polyvinyl alcohol-containing vinyl chloride-vinyl acetate copolymer, polyurethane elastomer and nitrile rubber (binder) | 20 parts by weight |
| Soybean lecithin (dispersant) | 1 part by weight |
| Oleic acid and liquid parrafin (lubricant) | 2 parts by weight |
| Mixture of methyl ethyl ketone, methyl isobutyl ketone and toluene (solvent) | 250 parts by weight |
| Polyisocyanate (cross-linking agent) | 2 parts by weight |
| Alumina (Mohs' hardness of 9) | different amounts below 5 parts by weight |
| $Cr_2O_3$ (Mohs' hardness of 7) | different amounts below 4 parts by weight |
| Zinc ferrite (Mohs' hardness of 6.5) | different amounts below 15 parts by weight |

The compositions of the above formulations were used to make magnetic video recording tapes having different amounts, within and outside of the range defined in the invention, of the non-magnetic materials in the same manner as in Example 1.

The tapes were each subjected to measurements of the head abrasion loss (100 hours), still picture characteristic (60 minutes), durability against repeated reproduction, maximum magnetic flux density and also checked to know the anti-clogging tendency. The results are shown in Table 3.

TABLE 3

| Amount of alumina (parts by weight) | Amount of zinc ferrite (parts by weight) | Amount of $Cr_2O_3$ (parts by weight) | Abrasion loss of head (μ) | Lowering of output level by still picture reproduction test of 60 min. (dB) | Lowering of output level by repeated reproduction test of 100 times (dB) | Anti-clogging tendency | Maximum magnetic flux density (Gauss) |
|---|---|---|---|---|---|---|---|
| 0.5 | 1 | 0.5 | 4 | −4.0 | −3.0 | good | 1470 |
| 0.5 | 1 | 4 | 5 | −0.1 | −1.0 | good | 1450 |
| 0.5 | 2 | 4 | 5 | −0.1 | −0.9 | good | 1450 |
| 0.5 | 7 | 4 | — | −0.1 | −0.1 | — | 1420 |
| 0.5 | 15 | 4 | 9 | −0.1 | −0.2 | good | 1260 |
| 1 | 1 | 1 | 4 | −3.5 | −3.2 | good | 1460 |
| 1 | 1 | 4 | 4 | −0.1 | −0.2 | good | 1430 |
| 1 | 2 | 4 | 4 | 0 | −0.2 | good | 1425 |
| 1 | 7 | 4 | — | −0.1 | −0.1 | — | 1420 |
| 1 | 15 | 4 | 8 | −0.1 | −0.1 | good | 1280 |
| 2 | 1 | 2 | 4 | −0.1 | −0.1 | good | 1450 |
| 2 | 7 | 2 | — | −0.1 | −0.1 | — | 1410 |
| 2 | 15 | 2 | 7 | −0.1 | −0.1 | good | 1300 |
| 4 | 1 | 1 | 5 | −0.1 | −0.8 | good | 1440 |
| 4 | 7 | 1 | — | −0.1 | −0.1 | — | 1420 |
| 4 | 15 | 1 | 8 | −0.1 | −0.1 | good | 1270 |
| 5 | 15 | 2 | 12 | −0.1 | −0.1 | rather poor | 1220 |
| 0.5 | 0.5 | 0.5 | 4 | −5.2 | −4.5 | good | 1460 |

The tapes using the three-component non-magnetic system in this Example are found to be superior as a whole to those of Examples 1 to 7 wherein two kinds of non-magnetic materials are used.

EXAMPLE 9

Example 8 was repeated except that there were used, instead of Co-$Fe_3O_4$, alumina, $Cr_2O_3$ and zinc ferrite, 100 parts by weight of Co-γ-$Fe_2O_3$, 1 part of alumina with a Mohs' hardness of 9, 4 parts by weight of $Cr_2O_3$ with a Mohs' hardness of 7, and 2 parts by weight of zinc ferrite with a Mohs' hardness of 6.5, thereby obtaining a magnetic video recording tape.

The tape was tested similarly to Example 8, with the following results:

| Head abrasion loss | 4 μ |
|---|---|
| Lowering of output level by still picture reproduction test | 0 dB |
| Lowering of output level by repeated reproduction test | −0.2 dB |
| Anti-clogging tendency | good |
| Maximum magnetic flux density | 1425 G |

The characteristics or properties of this tape are considered to be more excellent than those of Examples 1–7.

EXAMPLE 10

Example 9 was repeated using, instead of the combination of alumina, $Cr_2O_3$ and zinc ferrite, 2 parts by weight of $Cr_2O_3$ with a Mohs' hardness of 7, 3 parts by weight of zinc ferrite with a Mohs' hardness of 6.5 and 3 parts by weight of calcium carbonate with a Mohs' hardness of 3–4, thereby obtaining a magnetic video recording tape.

The tape was tested similarly to Example 8 with the following excellent results:

| Head abrasion loss | 3 μ |
|---|---|
| Lowering of output level by the still picture reproduction test | −0.4 dB |
| Lowering of output level by the repeated reproduction test | −0.5 dB |
| Anti-clogging tendency | good |
| Maximum magnetic flux density | 1420 G |

The tape of this Example using the three-component non-magnetic system is considered superior, as a whole, to those of Examples 1–7 using two-component non-magnetic systems.

EXAMPLE 11

Example 9 was repeated using, instead of the combination of alumina, $Cr_2O_3$ and zinc ferrite, 1 part by weight of silicon carbide with a Mohs' hardness of 9.3, 1 part by weight of titanium oxide with a Mohs' hardness of 7, and 5 parts by weight of α-iron oxide with a Mohs' hardness of 6, thereby obtaining a magnetic video recording tape.

The tape was tested similarly to Example 8 with the following excellent results:

| Head abrasion loss | 3 μ |
|---|---|
| Lowering of output level by the still picture reproduction test | −0.2 dB |
| Lowering of output level by the repeated reproduction test | −0.6 dB |
| Anti-clogging tendency | good |
| Maximum magnetic flux density | 1430 G |

In this case, the tape characteristics or properties are considered more excellent than those of the tapes of Examples 1–7 using the two-component non-magnetic systems.

COMPARATIVE EXAMPLE 1

Example 2 was repeated except that there were used, instead of alumina and zinc ferrite, 2 parts by weight of alumina with a Mohs' hardness of 9 and 6 parts by weight of gypsum with a Mohs' hardness of 2, thereby obtaining a magnetic video recording tape.

The tape was tested similarly to Example 2 with the following results:

| Head abrasion loss | 3 μ |
|---|---|
| Lowering of output level by the still picture reproduction test | −7.5 dB |
| Lowering of output level by the repeated reproduction test | −5.0 dB |
| Anti-clogging tendency | poor |
| Maximum magnetic flux density | 1450 G |

As will be clear from the above results, the lowerings of output level by the both methods and the anti-clogging tendency are poor.

COMPARATIVE EXAMPLE 2

Example 2 was repeated using, instead of alumina and zinc ferrite, 2 parts by weight of alumina with a Mohs' hardness of 9 and 2 parts by weight of $Cr_2O_3$ with a Mohs' hardness of 7, thereby obtaining a magnetic video recording tape.

The thus obtained tape was tested similarly to Example 2 with the following results:

| Head abrasion loss | 7 μ |
|---|---|
| Lowering of output level by the still picture reproduction test | 0 dB |
| Lowering of ouput level by the repeated reproduction test | −1.5 dB |
| Anti-clogging tendency | rather poor |
| Maximum magnetic flux density | 1470 G |

As will be clear, the abrasion loss and anti-clogging tendency are not satisfactory.

COMPARATIVE EXAMPLE 3

Example 2 was repeated using, instead of alumina and zinc ferrite, 5 parts by weight of α-iron oxide with a Mohs' hardness of 6 and 5 parts by weight of zinc ferrite with a Mohs' hardness of 6.5, thereby obtaining a magnetic video recording tape.

The tape was tested similarly to Example 2 with the following results:

| Head abrasion loss | 4 μ |
|---|---|
| Lowering of output level by the still picture reproduction test | −6.5 dB |
| Lowering of output level by the repeated reproduction test | −4.5 dB |
| Anti-clogging | rather poor |
| Maximum magnetic flux density | 1380 G |

The lowerings of output level by the both tests and the anti-clogging tendency are found not to be satisfactory.

COMPARATIVE EXAMPLE 4

Example 11 was repeated without use of any of silicon carbide, titanium oxide and α-iron oxide, thereby obtaining a magnetic video recording tape.

The thus obtained tape was tested similarly to Example 11 with the following results:

| Head abrasion loss | 3 μ |
|---|---|
| Lowering of output level by the | −20 dB |

| | |
|---|---|
| still picture reproduction test | |
| Lowering of output level by the repeated reproduction test | −11 dB |
| Anti-clogging | poor |
| Maximum magnetic flux density | 1460 G |

From the above it is found that the lowerings of output level in the both cases and the anti-clogging tendency are not satisfactory.

Figure 6:
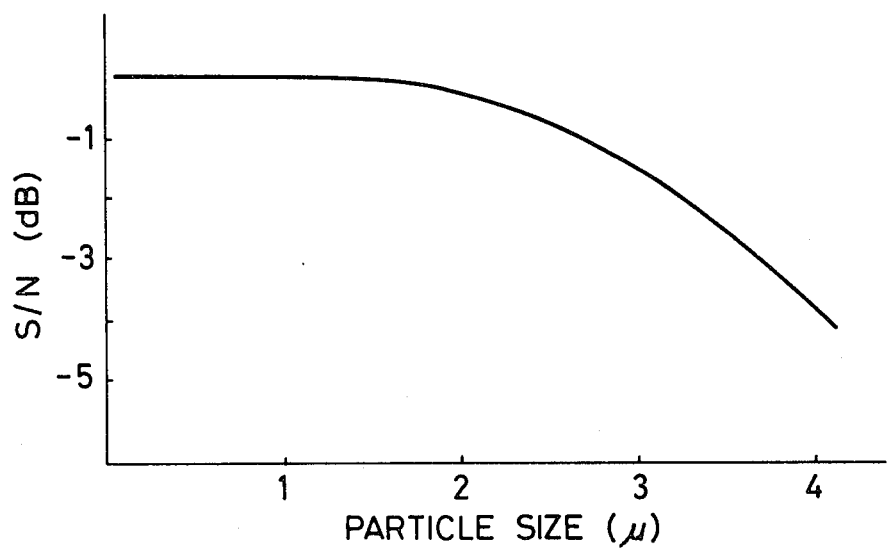

In all the Examples 1–11 and Comparative Examples 1–3, the non-magnetic materials used were powdered to have an average size of below about 2μ since larger average size had been found to give a more adverse effect on electric characteristics of magnetic tapes. This was confirmed as follows: Magnetic video recording tapes were made using dispersed solid systems containing non-magnetic alumina powders of different average sizes in a constant amount of 15 wt% of magnetic powder and were tested to determine their S/N ratio. FIG. 6 shows variation of the S/N ratio of magnetic tape in relation to average particle size of alumina powder. From the figure, it will be seen that the S/N ratio relatively sharply decreases when the average size exceeds 2μ, resulting in deterioration in quality of image.

What is claimed is:

1. A magnetic recording composition comprising a non-aqueous dispersion, in a liquid dispersion medium, of a dispersed solid phase of a major proportion of a magnetic powder and a minor proportion of a three-component non-magnetic powder system comprised of two types of non-magnetic powders each having an average particle size below 2μ, one type having a Mohs' hardness greater than or equal to 7 and being contained in an amount of from 1 to 5 wt.% of said magnetic powder; and the other type having a Mohs' hardness less than 7 but greater than about 3 and being contained in an amount of from 7 to 15 wt.% of said magnetic powder; said three-component system being comprised of two kinds of said one type of the non-magnetic powders and one kind of said other type of the non-magnetic powders.

2. A magnetic recording composition according to claim 1 wherein said three-component system is comprised of alumina and $Cr_2O_3$ as said one type, and of zinc ferrite as said other type.

3. A magnetic recording composition according to claim 1 wherein said three-component system is comprised of silicon carbide and titanium oxide as said one type, and of α-iron oxide as said other type.

4. A magnetic recording composition according to claim 1 wherein said one type is contained in an amount of from 3 to 5 wt.% of said magnetic powder.

5. A magnetic recording composition comprising a non-aqueous dispersion, in a liquid dispersion medium, of a dispersed solid phase of a major proportion of a magnetic powder and a minor proportion of a three-component non-magnetic powder system comprised of two types of non-magnetic powders each having an average particle size below 2μ, one type having a Mohs' hardness greater than or equal to 7 and being contained in an amount of from 2 to 5 wt.% of said magnetic powder; and the other type having a Mohs' hardness of less than 7 but greater than about 3 and being contained in an amount of from 6 to 15 wt.% of said magnetic powder; said three-component system comprised of one kind of said one type of the non-magnetic powders and two kinds of said other type of the non-magnetic powder; wherein said three-component system is comprised of $Cr_2O_3$ as said one type, and of zinc ferrite and calcium carbonate as said other type.

6. A magnetic video recording article comprising a base coated with the composition of claim 1 or 5.

7. A magnetic video recording article according to claim 6 wherein said base is a polyester film.

* * * * *